United States Patent Office 3,082,066
Patented Mar. 19, 1963

3,082,066
PRODUCTION OF BARIUM HYDROXIDE
MONOHYDRATE
Bennie Le Roy Benning and Carl John Cuneo, Modesto,
Calif., assignors to FMC Corporation, New York, N.Y.,
a corporation of Delaware
No Drawing. Filed Nov. 24, 1961, Ser. No. 154,858
4 Claims. (Cl. 23—186)

This invention relates to a process for producing barium hydroxide monohydrate and more particularly to producing barium hydroxide monohydrate having a desirably low reactivity rate and a high degree of purity.

Barium hydroxide is useful for producing additives in oil lubricants used in internal combustion engines. This material is reacted with various organic acids, e.g. alkyl benzene sulfonates, to form these additives. As a result of the dispersing properties of the organic additives, better lubrication by the oil is obtained, and the accumulation of hard residues on the internal walls of the engine is prevented. To date, barium hydroxide pentahydrate, barium hydroxide octahydrate, and barium oxide have been extensively employed. The barium hydroxide is preferred over the dense barium oxide because hydrated barium hydroxide, either in the form of pentahydrate or octahydrate, can be produced in more pure form. While these hydrated barium hydroxides are suitable, they contain large quantities of water, upwards of 33% by weight. The use of compounds containing such large proportions of water is undesirable because of the high cost of shipping. In an effort to increase the weight of the barium hydroxide relative to the total weight of the final product, barium hydroxide monohydrate has been advocated as a substitute for the more highly hydrated forms of barium hydroxide.

One of the problems which arises in producing suitable barium hydroxide monohydrate is in obtaining a compound having a sufficiently low reactivity rate. The reactivity rate is important because it reflects the temperature increases resulting from the exothermic reaction of barium hydroxide monohydrate with water, and indicates the extent of the exothermic reaction during the time the reaction proceeds.

In general, low reactivity rates are desirable because reaction of the barium hydroxide monohydrate with the organic acid should be carried out under conditions which do not foster side reactions or degradation of the labile organic products. High temperatures and/or long periods at elevated temperatures tend to encourage side reactions and should be avoided. The reactions of the barium hydroxide monohydrate and organic acids are carried out in a two-phase, heterogenous reaction system in which water and an organic solvent e.g. a light oil alone, or diluted with other volatile liquids, are the solvents. This reaction is exothermic, requiring suitable refluxing and heat exchange apparatus for removing as much of the heat as possible. A major portion of the heat is liberated by reaction of the $Ba(OH)_2 \cdot H_2O$ with the aqueous solvent. Compounds having low reactivity rates minimize conditions which promote side reactions during the exothermic reaction, and thus are highly desirable. Further, compounds having low reactivity rates tend to discourage an overload of the existing cooling and reflux equipment, permitting maximum production of the additives in existing equipment.

Another problem which has arisen is the maintenance of high purity levels. Of primary concern is the contamination of the barium hydroxide monohydrate by molecularly hydrated species other than the monohydrate. Mixtures of higher hydrates with the monohydrate are undesirable since they result in higher and non-uniform reactivity rates. Additionally, the two principal impurities, barium carbonate and barium sulfate, must be kept low.

It is an object of the present invention to produce highly pure barium hydroxide monohydrate having a low reactivity rate which is suitable for use as a lubricating oil additive.

This and other objects will become apparent from the following disclosure.

It has now been found unexpectedly that barium hydroxide monohydrate having a particularly desirable degree of reactivity and high purity can be produced in a non-dusting, flaked form, by placing a thin film, up to about .025 inch in thickness of a solution of barium hydroxide containing from about 50 to about 66% barium hydroxide on a heated surface maintained at from about 225° to about 275° F., thereby rapidly removing water from the film of barium hydroxide solution and recovering dried flake particles of barium hydroxide monohydrate from said surface.

The barium hydroxide monohydrate produced by this process is a free-flowing, flaky material having a bulk density of 65 to 75 lbs. per cubic foot, and contains no material impurities other than up to about 0.4% barium carbonate, and up to .03% barium sulfate. The particle size of the product is generally about 8% +8, 79% −8, +200, and 13% −200 mesh.

The reactivity rate of the barium hydroxide monohydrate is measured in terms of its reactivity index which is determined as follows:

Seven and a half grams of barium hydroxide monohydrate are added to 75 ml. of Esso Coray 40 oil contained in a 1-pint Dewar flask. The solid is kept dispersed in the oil by mechanical stirring with a steel propeller turning at 550 r.p.m. The pitch of the blade is maintained at 45° and the diameter is 95% of the flask. The blade bottom is rounded to fit the flask and is set ⅛ inch above the bottom of the flask. Stirring is continued for 30 minutes after which time the heat of the stirring equals the heat loss of the system and a constant temperature is reached. Sufficient water is then added from a microburette to form the octahydrate plus one mol in excess. The rise in temperature is recorded every half minute to the closest tenth of a degree centigrade by a thermometer dipped in the reaction mixture. The rise in temperature after one minute, the maximum temperature, and the time required to reach the maximum temperature are determined. The reactivity index is the sum of the temperature rise after one minute (expressed as ° C./min.) and the ratio of total rise in temperature divided by the time required to reach the maximum temperature (expressed as ° C./min.). For example, if during the first minute the increase in temperature was 2° C., and it took 10 minutes to reach a maximum temperature rise of 10° C., then the reactivity index would be:

$\Delta$ temp./1 (° C./min.)+$\Delta$ temp./$\Delta$ time (° C./min.)
  =2° C./1 min.+10° C./10 min.=3.0

The presently produced $Ba(OH)_2 \cdot H_2O$ was found to have a reactivity index of about 2.90.

It is surprising that this process yields barium hydroxide monohydrate having a low reactivity index. Other processes give barium hydroxide monohydrate products having reactivity indexes which are considerably higher. Typical methods which have been employed in an attempt to produce suitable barium hydroxide monohydrate are as follows:

(A) *Spray drying.*—This process is carried out by spray drying a concentrated solution of barium hydroxide on an indirectly heated air stream.

(B) *Continuous crystallization.*—This process is performed by circulating a concentrated solution of barium hydroxide in a crystallizing evaporator, centrifuging the mixture at 110° C., and drying the crystals in a steam tube, scraped surface dryer. A uniform crystal is obtained on the dryer surface.

(C) *Atmospheric dehydration.*—This process is performed by heating a concentrated solution of barium hydroxide in a steam pug mill until the equivalent monohydrate point is reached. The dry agglomerates are then crushed and ground to size.

(D) *Vacuum dehydration.*—This process is performed by treating solid flakes of commercial barium hydroxide pentahydrate, obtained by chill flaking octahydrate to pentahydrate, in a steam tube vacuum dryer. The flakes are heated and agitated in the vacuum dryer to obtain the barium hydroxide monohydrate.

(E) *Azeotropic distillation.*—This process is carried out by distilling barium hydroxide pentahydrate in benzene. Water from the pentahydrate is removed with the benzene, as an azeotropic mixture overhead. The wet pulp was centrifuged and excess benzene was driven off in a vapor recovery dryer. The resultant barium hydroxide monohydrate was recovered as a fine powder.

Reactivity indexes obtained from the barium hydroxide monohydrates produced by the above processes are given in Table I.

TABLE I

| Process | Reactivity Index | | | Impurities |
|---|---|---|---|---|
| | ΔT/ 1 min. | ΔTemp./ Δtime | Index | |
| Spray drying | 2.50 | 2.08 | 4.58 | 3.4% BaCO₃. |
| Continuous Crystallization | 4.51 | 0.93 | 5.44 | 0.4% BaCO₃. |
| Atmospheric Dehydration | 4.11 | 0.39 | 4.50 | .4% BaCO₃. |
| Vacuum Dehydration | 5.65 | 0.88 | 6.53 | 0.6% BaCO₃. |
| Azeotropic Distillation | 5.13 | 1.98 | 7.11 | 0.4% BaCO₃. |
| Present Process | 2.40 | 0.50 | 2.90 | 0.4% BaCO₃. |

Production of suitable barium hydroxide monohydrate from direct aqueous mixtures of dense barium oxide yields a product having unacceptably high quantities of barium carbonate and barium sulfate.

In carrying out the process, a solution of barium hydroxide which may contain from about 50 to 66% barium hydroxide is heated to a temperature of between 90 to 110° C., and fed into a dispersing apparatus. This disperser may be a controlled splash pan or other means for uniformly distributing the solution of barium hydroxide in a thin liquid layer. The solution of barium hydroxide is placed on a smooth, heated surface in a thin layer no thicker than .025 inch, and the water evaporated from the solution. The heated surface may be any means which can rapidly heat the thin film of barium hydroxide solution and drive off the water. The heated surface is maintained at a temperature of about 225° to 275° F. When the water has been driven off, the resultant barium hydroxide monohydrate (about 97.5% Ba(OH)₂·H₂O) is removed from the heated surface as small flakes, and generally has a particle distribution as follows:

7 to 11% +8 mesh
75 to 78% −8 +200 mesh
13 to 14% −200 mesh

In addition to having a low reactivity index, it is desirable that the barium hydroxide monohydrate be of high purity. One serious group of contaminants is molecularly hydrated barium hydroxides other than the monohydrate. The present process has been found unusually suitable for preventing this contamination. Examination by X-ray diffraction of the barium hydroxide monohydrate product obtained by this thin-film evaporation procedure, fails to show the presence of other hydrates of barium hydroxide. In addition, other contaminants such as barium carbonate and barium sulfate are present in extremely small amounts, i.e., less than 0.5% barium carbonate, and less than 0.03% barium sulfate.

The particle size of the barium hydroxide monohydrate must be sufficiently large to reduce dusting, but small enough to dissolve without difficulty and to permit easy handling. In addition, the barium hydroxide monohydrate must have good flowability; that is, it must not form agglomerates upon being packed and stored. One method for testing for flowability is by pouring the barium hydroxide monohydrate into a 4-inch I.D. steel cylinder 8 inches long, up to one inch from the top without packing it down. A 3⅜ inch diameter piston is then inserted and loaded with a 300 lb. weight, after which all the weight is removed and the amount of agglomerated material is weighed. In the present process no agglomerates are formed, and a free-flowing material remains.

It should be noted that the product does not require a flow promoter such as MgO·2.5SiO₂·H₂O, which is commonly used with commercially prepared barium hydroxide pentahydrate. This is advantageous because it avoids the inclusion of foreign impurities which must be separated out after the organic acid and barium salt have reacted. In some cases, this separation is difficult and results in "off colored" additives.

The following examples are given to illustrate the invention but are not intended to limit the scope thereof.

*Example I*

A concentrated aqueous solution of barium hydroxide, 62.3% by weight Ba(OH)₂, was heated to 100° C. and fed into the bottom of a splash pan of a steam-heated, twin-surfaced dryer. The steam side temperature of the dryer was maintained at 340° F.±3° F. when using surfaces of between ⅞ to 1¼ inch wall thickness. The temperature of the outside surface of the dryer was maintained at about 250° F. The splasher comprised prongs fixed perpendicularly to a 2-inch IPS shaft ¼ inch in diameter and 1½ inches long. The splasher had four prongs equally spaced in a plane perpendicular to the shaft on 1-inch centers staggered 45° in an axial plane. The splasher speed was adjusted to provide an even coating of barium hydroxide solution on the dryer surface. The surfaces were rotated at 4 r.p.m. and the splasher was run at 400 r.p.m. A product was obtained at the rate of 14.5 lbs./hr./ft.² of drying surface, which upon analysis yielded 97.6% Ba(OH)₂·H₂O or 88.3% Ba(OH)₂. This product, with a reactivity index of 2.90, was found suitable for use in forming alkyl benzene sulfonated oil additives.

*Example II*

A concentrated aqueous solution of barium hydroxide, 62.9% by weight Ba(OH)₂ was heated to 100° C. and fed into the bottom of a splash pan of a steam-heated, twin-surfaced dryer of the type employed in Example I. The steam side temperature of the dryer was maintained at 324° F.±3° F. The temperature of the outside surface of the dryer was maintained at about 234° F. The surfaces were rotated at 2.9 r.p.m., and the splasher was run at 407 r.p.m. A product was obtained at the rate of 10.9 lb./hr./ft.² of drying surface, which upon analysis yielded 97.4% Ba(OH)₂·H₂O or 88.1% Ba(OH)₂.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. The method of producing barium hydroxide monohydrate having a desirable reactivity and a high degree of purity, which comprises placing a thin film, no thicker than .025 inch, of a solution of barium hydroxide containing from about 50 to about 66% barium hydroxide on a heated surface maintained at about 225° F. to about 275° F., rapidly removing water from the film of barium hydroxide solution and recovering dried flake particles of barium hydroxide monohydrate from said heated surface.

2. The process of claim 1 wherein said barium hydroxide monohydrate contains less than 0.5% barium carbonate.

3. Process of claim 1 wherein said barium hydroxide monohydrate has a bulk density of about 65 to 75 lb./cu. ft.

4. Process of claim 1 wherein said barium hydroxide monohydrate has a particle size of about 7 to 11% +8 mesh, 75 to 78% −8, +200 mesh and 13 to 14% −200 mesh.

References Cited in the file of this patent

J. W. Mellor's "A Comprehensive Treatise on Inorganic and Theoretical Chemistry," vol. 3, 1923 ed., page 676, Longmans, Green and Co., N.Y.

Thorpe's Dictionary of Applied Chemistry, vol. 1, 1941 ed., page 640, Longmans, Green and Co., N.Y.